March 4, 1941.    G. LEWIN    2,233,788
RADIATION PYROMETER
Filed April 8, 1939
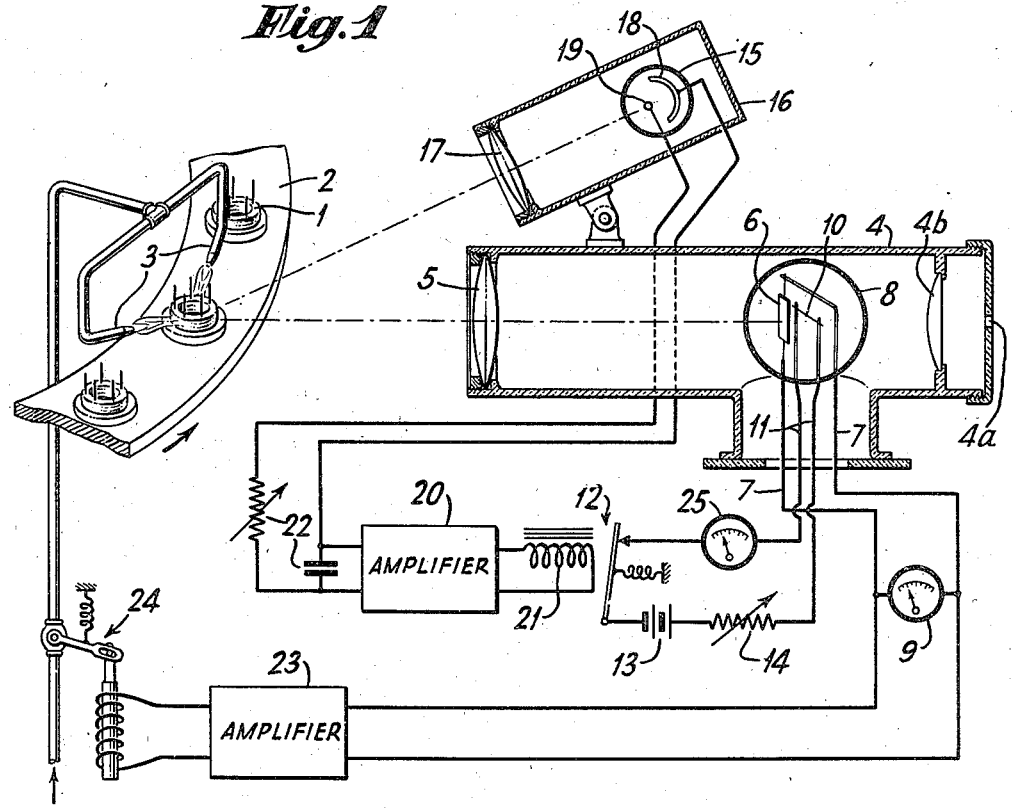
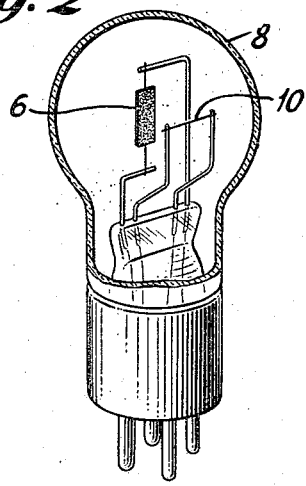
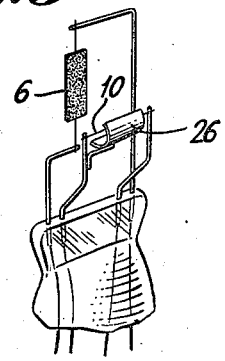
INVENTOR.
GERHARD LEWIN
BY Charles McClair
ATTORNEY.

Patented Mar. 4, 1941

2,233,788

UNITED STATES PATENT OFFICE 2,233,788

RADIATION PYROMETER

Gerhard Lewin, Newark, N. J., assignor to Radio Corporation of America, a corporation of Delaware Application April 8, 1939, Serial No. 266,896

5 Claims. (Cl. 236—78)

My invention relates to temperature measuring and regulating devices, particularly for rapidly measuring and accurately regulating the temperature of heated bodies.

Many articles that are heated in manufacture must be raised to an optimum temperature for best results. The correct temperature, however, is usually approximated by the appearance of the heated bodies. In the factory where the heating time of the article is short the optical pyrometer in which colors must be visually matched is not feasible, and the radiation pyrometer of the Féry type in which a thermocouple must respond to radiant heat is not practical because of inherent heat inertia and time delay of the thermocouple.

An object of my invention is an improved radiation pyrometer for overcoming time lag in response caused by the inherent inertia of the pyrometer.

My improved temperature measuring device comprises a thermocouple in an evacuated envelope mounted in a housing to shield the thermocouple from stray heat radiations, the housing having a lens for directing upon the thermocouple heat rays from a heated body. To increase the sensitivity of the thermocouple to radiant heat, the thermocouple may comprise blackened ribbon upon which the heat rays may be focused. Preferably the ribbon is welded at its ends to wires of dissimilar metals, the wires being connected through lead-in conductors to an indicating instrument. Because of the inherent thermal inertia of the thermocouple its temperature cannot be immediately raised to a constant level by the heat rays, and where the body to be measured cannot be observed for the necessary time because of its movement in the machine carrying the body, the reading does not correctly indicate the temperature of the body.

According to my invention I provide an electrical heater such as a filament in heat transfer relation with the thermocouple to heat it to near its operating temperature. During the intervals the thermocouple is not exposed to the radiant energy of the body to be tested, electric current is supplied to the heater through the contacts of a relay which are open and closed in response to current flowing through a phototube focused upon the heated body to be observed. In operation the auxiliary heater for the thermocouple is lighted to bring the temperature of the thermocouple to some value equal to or near the expected operating temperature of the thermocouple. The instant a heated body comes into view of the thermocouple and of the phototube, the heating circuit for the auxiliary heater is interrupted and the temperature of the thermocouple is now determined by the radiant energy from the heated body.

The characteristic features of my invention are defined with particularity in the appended claims and preferred embodiments are described in the following specification and shown in the accompanying drawing in which Figure 1 shows diagrammatically the circuit and structural features of one embodiment of my invention and Figures 2 and 3 are detailed views of tubes for my improved pyrometer.

My pyrometer is adapted to measure the temperature of articles in manufacture where the article moves continuously or intermittently on a carrier through heating zones as between heating devices such as gas burners. In radio tube manufacture, for example, many glass parts such as stems with sealed in wires must be heated to an optimum temperature to insure good seals. One type of stem 1, comprises a glass annulus with circularly arranged wires sealed therethrough, is carried upon a rotary table 2 of a machine for successively bringing the stems into registry with spaced gas burners 3. My improved device for measuring the temperature of the glass bodies comprises an elongated tubular housing 4 of opaque material and closed at one end with a lens 5, preferably quartz, for receiving heat and light rays from the heated body and focusing the rays upon the thermocouple 6. A small observation hole 4a in the rear of the housing, and a lens 4b may be employed to facilitate focusing the image of the test body on the thermocouple of my device. The thermocouple in the particular embodiment shown comprises a thin ribbon of metal such as foil, welded at opposite ends to short lengths of fine wires of dissimilar metals. These fine wires are connected to and supported by heavy lead-in conductors 7 sealed in the wall of the enclosing envelope 8 and are connected to the terminals of a microvoltmeter 9. The voltage generated between the dissimilar wires of the thermocouple is determined by the temperature of the ribbon and is impressed upon the meter so that needle deflection may be calibrated in terms of temperature.

Since in factory practice the thermocouple can be focused upon the source of heat at the test body 1 for only a limited time and since this time may be less than the time required to bring the thermocouple to a steady operating temperature, I propose according to my invention to maintain the temperature of the thermocouple by auxiliary heating means to a temperature at or near its operating value. The heater preferably comprises a filament 10 in the envelope and in spaced relation with the thermocouple ribbon and connected to lead-in conductors 11 connected through the relay contacts 12 to a voltage source 13. With the contacts closed the temperature of the filament may be adjusted by the series resistor 14. In Figure 1 the filament is shown to the rear of or on the side of the thermocouple opposite the heated object.

Light responsive means such as a photoelectric device is provided according to my invention for electrically opening and closing the auxiliary heater circuit in response to light from the heated test body in front of the pyrometer. The light responsive device may be of the current generating type, such as a photocell, or of the current modifying type, such as the phototube. For convenience the device is shown and described as a phototube 15 focused upon the test body and enclosed in an opaque housing 16 open to light only through the lens 17 in the end opposite the photocathode 18 of the phototube. The housing is adjustably mounted upon the pyrometer so that it can be focused accurately upon the test body in front of the pyrometer. The relay contacts may be made to respond to the minute current or voltage changes in the output circuit of the photoelectric device by connecting the output circuit of the photoelectric device to the input of a direct current amplifier 20, the output of the amplifier being connected to the terminals of an actuating winding 21 for the relay.

With no illuminating body in front of the phototube, the amplifier is adjusted to close the heater battery circuit and the temperature of the thermocouple is adjusted by resistor 14 to an estimated value as near its operating temperature as possible. As a heated test body comes into position before the lens of the pyrometer the phototube impulses the amplifier which opens the contacts of the relay and disconnects the heater from its power source. Simultaneously heat is applied to the thermocouple from the test body through the lens 5 and the temperature of the thermocouple quickly comes to its operating temperature determined by the test body and the resulting needle deflection indicates the temperature of the body.

It may be desirable in some cases to indicate only the average temperature of a series of test bodies as they pass the pyrometer and to prevent the thermocouple from cooling only when the approach of uniformly spaced heated bodies is interrupted. To prevent closing of the heater circuit except when such an interruption occurs a time delay circuit may conveniently be placed in the amplifier or in the coupling between the amplifier and phototube. A conventional resistor-condenser network 22 in the phototube line may conveniently be employed. Alternatively a one-way dash-pot may be connected to the armature of the relay to prevent sudden closing.

Heated bodies which appear before the pyrometer at a temperature above or below a predetermined optimum temperature may be rejected, according to a further feature of my invention, by actuating means responsive to predetermined threshold values of thermocouple voltage. Alternatively, the thermocouple voltage may be employed to regulate and control, through an amplifier 23, a relay actuated gas valve 24, to keep the temperature of the heated body within given limits.

The materials used in the thermocouple and their dimensions are selected for their adaptability to the particular type of tests to be made. A thermocouple with a ribbon of silver foil about .0002 to .0004 inch in thickness and .010 inch in width and .100 inch in length welded at one end to a gold-palladium alloy wire .001 inch in diameter and welded at the other end to an iron wire .001 inch in diameter has given good results in an evacuated envelope in measuring the temperature of small glass bodies, such as radio tube stems, heated to about 900° C. The silver foil exposed to the heated object is blackened, as by carbonizing, to increase its heat absorption and to obtain a pyrometer reading equivalent to the black body temperature of the heated object, and the other side is bright to reduce heat losses. The larger the surface of the heated ribbon, the larger may be the image of the heated body focused upon the ribbon, to give a more accurate integration of the temperature of the entire body. In measuring small objects, however, where a point source of radiation from the body is sufficient for determining its temperature the thermocouple may be crossed wires with the point source of radiation focused upon their junction.

In Figure 2 the heating element is shown as a fine filamentary wire spaced from and stretched opposite the center of the blackened surface of the ribbon, while in Figure 3 the heating element is opposite the lower end of the ribbon and provided with a reflector 26 for directing all of the filament heat to the ribbon.

In a pyrometer tube of known characteristics, the current through auxiliary heater measured by a current meter 25 may be used for checking the calibration of the thermocouple indicating meter 9. The auxiliary heating element may, if desired, be external of the enclosing envelope of the thermocouple especially if protected from extraneous heat disturbances.

A radiation pyrometer constructed according to my invention overcomes the time delay in response caused by the inherent thermal inertia of a thermocouple, is rugged in construction and easy to adjust, calibrate and use.

I claim:

1. In a device of the character described, a thermocouple responsive to radiant energy from a source of heat, a filament in heat transfer relation with the thermocouple, a voltage source, a normally open switch connected in circuit between said voltage source and said filament, and a photoelectric device positioned to receive radiant energy from said source of heat and coupled to said switch to close said circuit during interruptions of radiant energy flow to said thermocouple.

2. In combination, an envelope, thermocouple in said envelope, an electrical heating element in said envelope, a voltage responsive device connected across said thermocouple, a photoelectric device, a relay comprising contacts and the winding of a cooperating electromagnet, a power source in circuit with said heating element and said contacts, a coupling circuit between said photoelectric device and said winding, opaque housings, said photoelectric device and said thermocouple being enclosed in said opaque housings with light openings to energize the photoelectric device and thermocouple from a common source of heat energy.

3. In combination, a thermocouple, heating means for said thermocouple, a power circuit including a switch for energizing said heating means, an amplifier to electromagnetically operate said switch, a photoelectric device coupled to the input of said amplifier, said photoelectric device and said thermocouple being responsive to a common source of heat and a utilization circuit coupled to said thermocouple comprising a relay responsive to generated thermocouple voltages for regulating the temperature of said source of heat.

4. A thermocouple comprising an envelope, electrically connected wires of dissimilar metals therein, means for heating said wires with radiant heat comprising a ribbon of metal foil joined to said wires, the side of said foil exposed to said radiant heat being blackened and the other side being bright, and an electrical heating element in heat transfer relation with said ribbon in said envelope.

5. A heat responsive device comprising an envelope, wires of dissimilar metals electrically connected in said envelope, means for heating said wires with radiant heat comprising a light weight sheet of metal connected to said wires, a heating filament in said envelope, and a reflector for directing heat from the filament onto said sheet.

GERHARD LEWIN.